United States Patent
Huang

[19]

[11] Patent Number: 6,009,521
[45] Date of Patent: Dec. 28, 1999

[54] SYSTEM FOR ASSIGNING BOOT STRAP PROCESSOR IN SYMMETRIC MULTIPROCESSOR COMPUTER WITH WATCHDOG REASSIGNMENT

[75] Inventor: Arthur Huang, Ta-Chi Taoyuan, Taiwan

[73] Assignee: Digital Equipment Corporation, Houston, Tex.

[21] Appl. No.: 09/178,184

[22] Filed: Oct. 23, 1998

Related U.S. Application Data

[63] Continuation of application No. 08/678,891, Jul. 12, 1996, Pat. No. 5,860,002.

[51] Int. Cl.[6] .................................................. G06F 9/44
[52] U.S. Cl. ........................................... 713/1; 713/2
[58] Field of Search ................................. 395/651, 652, 395/653, 712, 200.5, 200.51, 200.52; 713/1, 2, 100; 709/220, 221, 222, 223

[56] References Cited

U.S. PATENT DOCUMENTS

| | | | |
|---|---|---|---|
| 4,888,683 | 12/1989 | Koizumi et al. | 395/652 |
| 5,450,576 | 9/1995 | Kennedy | 395/652 |
| 5,491,788 | 2/1996 | Capulis et al. | 714/13 |
| 5,627,962 | 5/1997 | Goodrum et al. | 714/13 |
| 5,659,748 | 8/1997 | Kennedy | 395/652 |
| 5,729,675 | 3/1998 | Miller et al. | 395/183.12 |
| 5,768,585 | 6/1998 | Tetrick et al. | 395/652 |

*Primary Examiner*—Dennis M. Butler
*Attorney, Agent, or Firm*—Hamilton, Brook, Smith & Reynolds, P.C.

[57] ABSTRACT

A boot strap assignment system is disclosed for a symmetric multiprocessor computer in which the role of the boot strap processor is assigned to one of the working processors by a central agent as part of power-on configuration. The system includes a system management processor which monitors the operation of the multiprocessor computer and controls a switching circuit that selectively transmits the boot strap assignment signal from the central agent to the working processors. Since the management processor monitors environmental conditions and shut-down events, it can predict the failure of working processors and assign the bootstrapping function appropriately. A watch dog timer is also provided in case the bootstrapping fails so that another working processor can be assigned the task of booting up the computer.

23 Claims, 3 Drawing Sheets

SYSTEM FOR ASSIGNING BOOT STRAP PROCESSOR IN SYMMETRIC MULTIPROCESSOR COMPUTER WITH WATCHDOG REASSIGNMENT

RELATED APPLICATIONS

This application is a continuation of U.S. patent application Ser. No. 08/678,891, filed Jul. 12, 1996, now U.S. Pat. No. 5,860,002, the entire teachings of which are incorporated herein by reference.

BACKGROUND OF THE INVENTION

Multiprocessor computers implement varying levels of symmetry. Master-slave processor computer systems are very asymmetric, whereas in computers designed with higher levels of symmetry, each of the working processors are capable of performing the same functions. In symmetric computers, the working processors share buses, address the same memory and basic input/output system (BIOS) resources, and receive the same array of interrupts.

Symmetric multiprocessor computers also tend to have a non-hierarchal bus arbitration process. The Intel® Pentium-Pro® Processor Bus arbitration protocol, for example, supports fair arbitration between a maximum of four working processors in the typical multiprocessor configuration. A unique identification, i.e., agent ID of 0, 1, 2, or 3, is assigned to each working processor as part of the power-on configuration by a central agent that is also responsible for bus arbitration control. Bus arbitration between the working processors is then made using a round-robin algorithm, which arranges the working processors in a circular order of priority: 0, 1, 2, 3, 0, 1, 2, etc. The working processor with the highest priority becomes the bus owner on every arbitration event, and the working processor that owns the bus is allowed to request its use. Input/output and possibly memory subsystems may, however, have higher priority, defeating the immediate use of the bus by the working processor.

The symmetry in some multiprocessor computers tends to break down when considering reset protocol in which the computer is bootstrapped after being powered-on or rebooted after an operating system failure. Pentium-Pro® multiprocessor systems fall into this class. The same working processor (called the boot strap processor) performs the bootstrapping operations every time the computer is powered-on. The bootstrapping can generally not be assigned among the other working processors even though they have access to the same computer system resources and would thus be capable of performing the role of boot strap processor.

SUMMARY OF THE INVENTION

The asymmetry in the reset process has undesirable artifacts. It is not entirely uncommon for at least one of the working processors in a multiprocessor computer to fail. If the failed working processor is also the assigned boot strap processor then the computer as a whole is inoperable. This risk is unacceptable for expensive multiprocessor computers performing time critical functions.

In one sense, however, the computer's failure should be avoidable. It is common for these computers to have a system management processor that monitors environmental conditions and shut-down events. From this information, the system management processor many times can predict the failure of the working processor, to which bootstrapping is assigned. Because of the asymmetry and rigidity of the computers in prior art designs, however, bootstrap processor reassignment cannot occur.

In general, according to one aspect, the present invention features a boot strap assignment method and system for a multiprocessor computer. The computer is symmetric at least to the extent that each of the working processors of the computer may perform the role of the boot strap processor. This role is assigned among the working processors by a central agent as part of the power-on configuration. An example of the central agent is a bus arbitration controller. The assignment system involves a system management processor which monitors the operation of the multiprocessor computer and controls a switching circuit that selectively transmits the boot strap assignment from the central agent to the working processors.

In specific embodiments, the switching circuit comprises a plurality of switches that intercept the boot strap assignment signal transmitted from the central agent to bus request lines passing between the working processors. A demultiplexor is used to decode boot strap selection signals from the system management processor. One of the switches is then selectively closed to pass the boot strap assignment to only one of the bus request lines.

As part of the embodiment, a watch dog timer function may be further included. This timer is then reset upon finishing bootstrapping the multiprocessor computer. Should the timer time-out after measuring a predetermined amount of time, however, the system management processor assumes a bootstrap failure. Accordingly, the system management processor assigns a new working processor as the boot strap processor utilizing the inventive switch circuit.

In general, according to another aspect, the invention may also be characterized as a method of assigning the bootstrapping function among multiple processors in a multiprocessor computer. The method includes intercepting the boot strap assignment signal from the central agent while determining which one of the multiple processors should perform the bootstrapping. The signal is then transmitted to the working processors to effect the selection.

The above and other features of the invention including various novel details of construction and combinations of parts, and other advantages, will now be more particularly described with reference to the accompanying drawings and pointed out in the claims. It will be understood that the particular method and device embodying the invention is shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
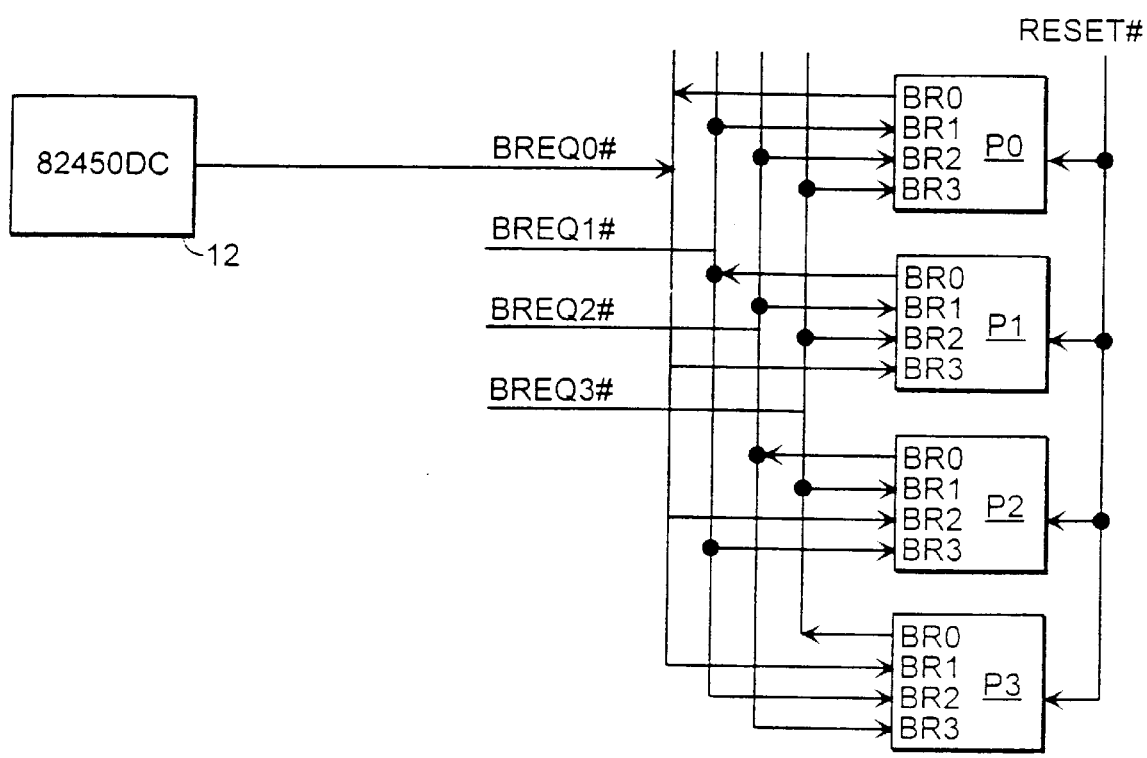
FIG. 1 is a block diagram showing the prior art method for distributing arbitration phase bus request signals among the four processors of a multiprocessor computer.

FIG. 1 shows the prior art bus arbitration aspects of a Pentium-Pro® multiprocessor computer having four working processors P0, P1, P2, P3.

Each of the working processors includes four bus request pins BR0, BR1, BR2, BR3 that are associated with bus arbitration. The BR0 bus request pin is an input/output pin on each of the working processors and is used to signal arbitration requests for the bus during normal operation. The BR1, BR2, BR3 bus request pin of each working processor are input only pins, being used to monitor the arbitration requests of the respective other working processors.

Bus request lines BREQ0#, BREQ1#, BREQ2#, BREQ3# are distributed among the four working processors P0, P1, P2, P3 in a rotating fashion. The BR0 pin of the first processor P0, for example is connected to the bus request line BREQ0#; the BR0 pin of the second processor P1 is connected to the BREQ1# bus request line, and so on. In a similar vein, the BR1 pin of the first processor P0 is connected to the BREQ1# bus request line; the BR1 pin of the second processor P1 is connected to the BREQ2# bus request line. The remaining lines and pins are connected in this fashion.

During bus arbitration, the bus owner among the working processors P0, P1, P2, P3 will arbitrate the bus via its BR0 pin. The bus request is passed to the BR1, BR2, BR3 pins of the other working processors via the bus request lines. In this way, each working processor P0, P1, P2, P3 can send its bus requests to the other working processors while monitoring the other processors requests.

Bus ownership, which is coordinated via the bus request lines, is rotated among the working processors based upon the agent ID. Each working processor maintains its agent ID, assigned as part of the power-on configuration, and an ID that indicates the current bus owner.

During power-on configuration of the computer, every working processor P0–P3 is assigned its unique agent ID. A central agent 12, the bus arbitration controller, is responsible for asserting the BREQ0# bus signal during reset. On the active to inactive transition of the computer reset signal RESET#, each of the working processors P0–P3 samples its BR1, BR2, BR3 pins to determine its corresponding agent ID for arbitration. In the illustrated example, processor P0 would have an agent ID of 0 since none of its BR1, BR2, and BR3 pins are active, and processor P3 would have an agent ID of 3 since its BR1 pin is active. The agent ID cannot change without the re-assertion of the RESET#.

The working processor that is assigned the agent ID of 0 recognizes that it is the boot strap processor. After the RESET# signal goes inactive, this assigned boot strap processor will automatically begin bootstrapping the computer and in time will bring the other working processors on-line. Since processor P0 must always receive the agent ID of 0, it is always the boot strap processor.

Figure 2:
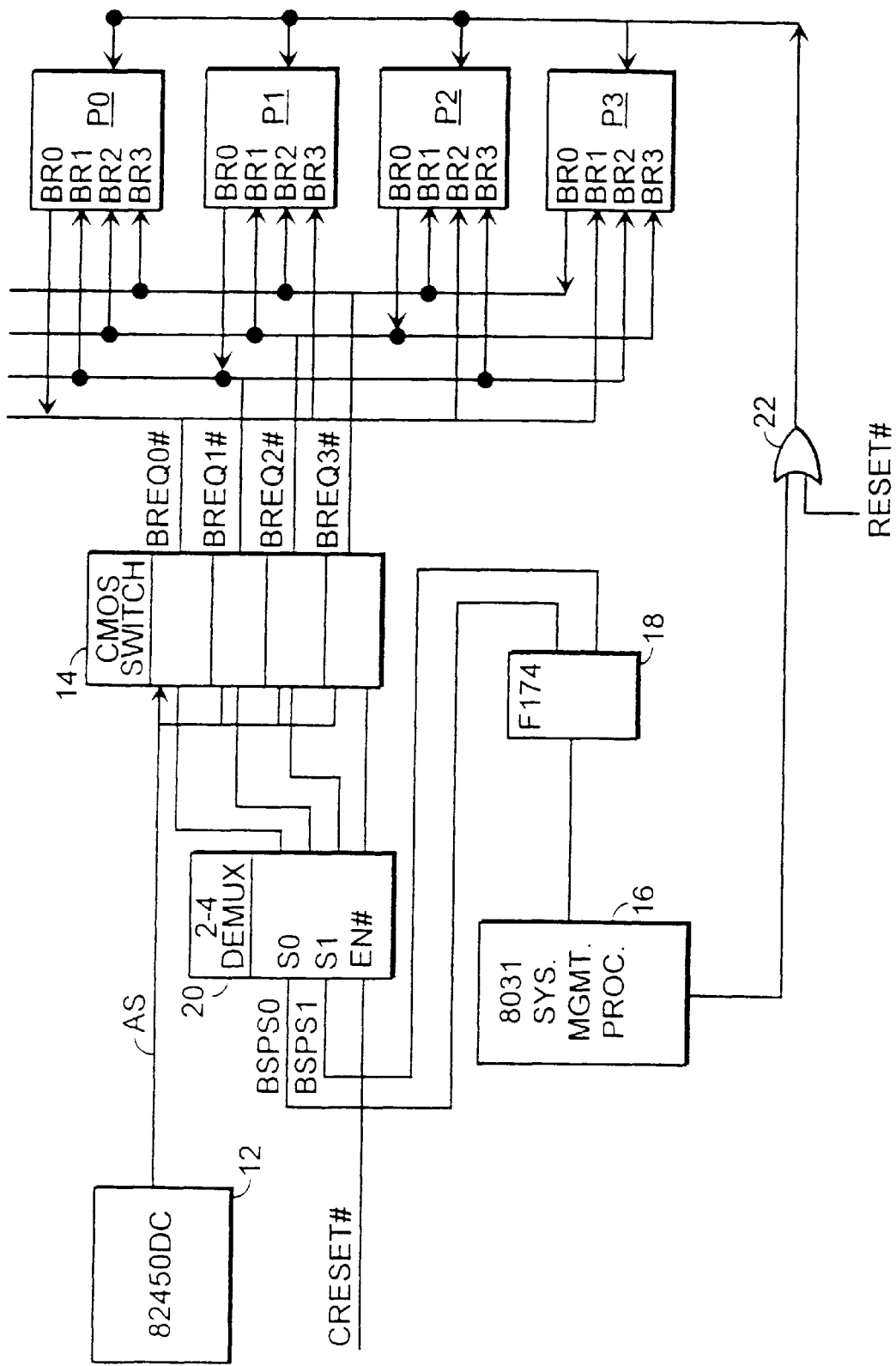
FIG. 2 is a block diagram showing a circuit for controlling the boot strap processor assignment process.

FIG. 2 shows a modification to the bus arbitration system that enables the control of the above-described boot strap processor assignment process.

The assignment signal on line AS from the bus arbitration system controller 12 is intercepted by switch circuit 14. The circuit 14 preferably uses CMOS switches to lower electrical loading and reduce delay time. This allows the timing requirements of the original specifications to be met.

The switch circuit 14 selectively transmits the assignment signal only to one of the bus request lines BREQ0#, BREQ1#, BREQ2#, BREQ3# during the assertion of the RESET# signal. This process has the effect of controlling the assignment of the agent IDs among the working processors P0, P1, P2, and P3, thus selectively dictating the boot strap processor.

The switch circuit 14 is controlled by a 8031 system management processor 16 through a latch 18 and demultiplexor 20. The system processor 16 performs a watch dog timer function in which it initiates its own reset of the working processors P0, P1, P2, P3 via OR gate 22, which also receives the system reset signal RESET#. The system management processor 16 is also connected to transducers, not shown, distributed around the computer to monitor environmental conditions such as temperature and line voltage. Additionally, it has non-volatile persistent storage and can access the main logic boards of the computer to interrogate the previously saved shut-down events.

Figure 3:
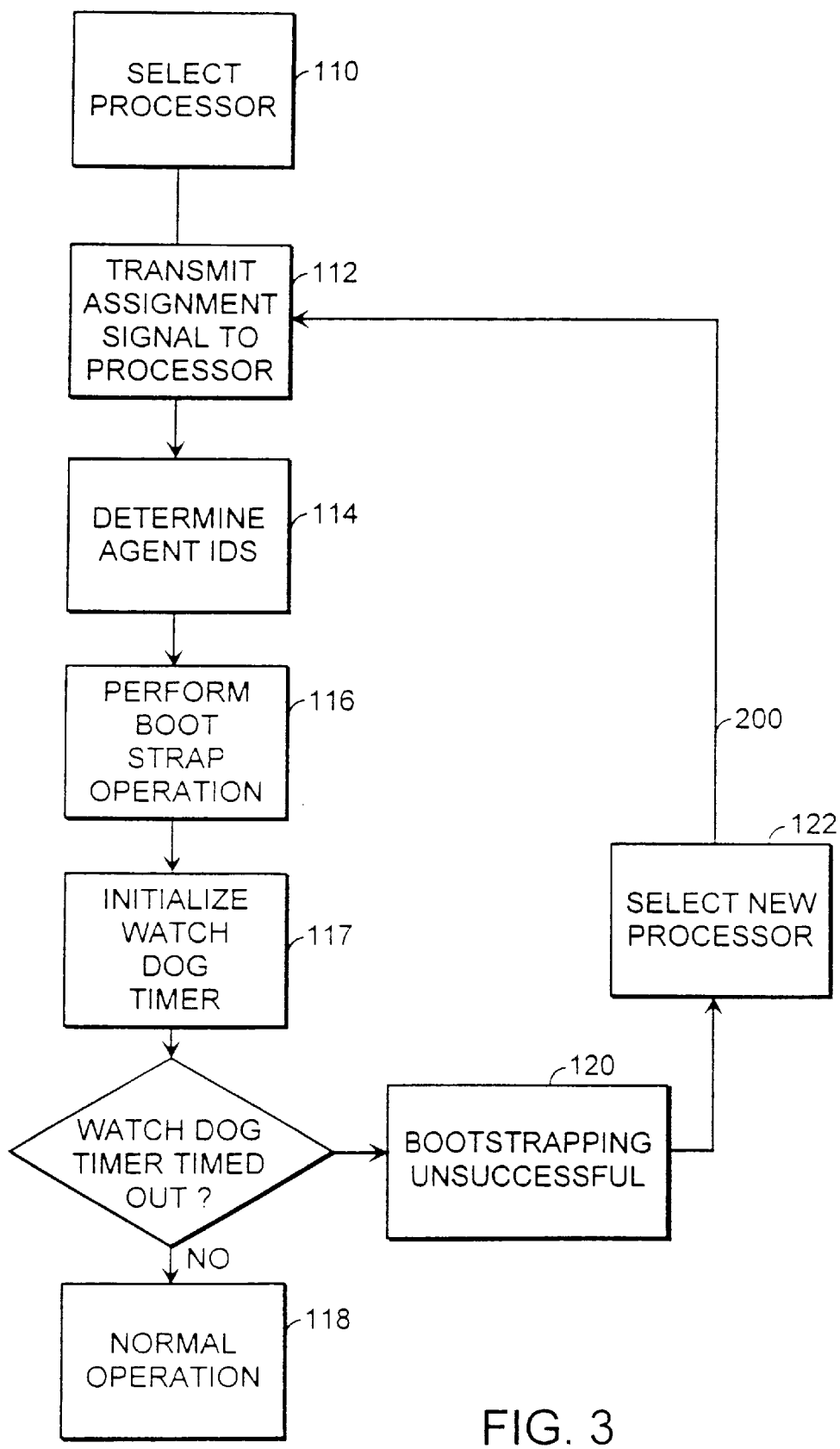
FIG. 3 is a process diagram illustrating boot strap processor assignment and possible reassignment in the event of bootstrapping failure according to the present invention.

FIG. 3 is a process diagram illustrating the boot strap assignment of the present invention utilizing the switch circuit 14 of FIG. 2. Based upon the available information such as previous, shut-down events and environmental conditions of the computer, the system management processor 16 determines which of the working processors P0, P1, P2, and P3 is functioning properly and is thus qualified to perform the bootstrapping operation in step 110.

The selection signal from the system management processor 16 is stored in the latch 18. The two-bit output BSPS0, BSPS1 of the latch 18 is provided to the S0 and S1 ports respectively of a 2:4 demultiplexer 20. Based upon this selection data, the demultiplexer 20 closes only one of the normally open CMOS switches 14 in response to receiving CRESET# signal at its enable port EN# in step 112. It therefore selects one of the bus request lines to receive the assignment signal AS from the bus arbitration controller 12. CRESET# is a delayed version of the system reset signal RESET# so that it is still valid on the active to inactive transition of the system reset signal RESET #, which causes the processors to sample their respective BR1–BR3 pins.

The selection process of the switches 14 determines the agent IDs, step 114, for the working processors P0–P3 since the assignment signal as is provided on the selected one of BREQ0# through BREQ3# lines. Based upon the established agent ID assignment protocol, the working processor whose BR0 pin is active and whose BR1, BR2 and BR3 pins remain inactive assumes the agent ID of 0, and takes the role as the boot strap processor. The working processor whose BR1 pin is active assumes the agent ID of 3; the working processor whose BR2 pin is active assumes the agent ID of 2; and the working processor whose BR3 pin is active assumes the agent ID of 1.

Shortly after the system reset signal RESET# is inactive, CRESET# is also de-asserted. When this occurs, the demultiplexor 20 is no longer enabled causing the CMOS switches 14 to open. Thus, the bus request lines BREQO# through BREQ3# become isolated and will not be influenced during normal operation by residual electrical loading from the added circuitry of the CMOS switches 14.

The assigned bootstrap processor accesses the boot address space in step 116. It initializes all functions on the system, finishes diagnostics, and wakes up the remaining working processors one at a time to ensure that they are properly functioning. The boot strap processor also updates a table that is accessible to the operating system indicating which of working processors are operating properly.

In parallel with the boot strapping of the computer, the system management processor 16 also initializes a watchdog timer function to begin counting-down from a predetermined time period in step 117. In the preferred embodiment, the time period is five seconds.

The final role of the assigned bootstrap processor is to signal the system management processor to reset the watchdog timer function. The resetting of the watchdog timer at the end of the bootstrapping indicates to the system management processor 16 that the bootstrapping operation was successful and that operation is proceeding normally.

It may occur, however, that the bootstrapping operation fails because of the failure of the bootstrapping processor. In this case, the boot strap processor will never reach the end of the bootstrapping operation and signal the system management processor 16. The watchdog timer will time-out indicating unsuccessful bootstrapping in step 120.

When the watchdog timer times-out, the system management processor 16 initiates a second reset operation and assigns the bootstrapping function to another processor by asserting its own reset to the working processor via the OR gate 22 with appropriate control of CRESET#, step 122. An indication of this newly assigned processor is stored in latch 18, and steps 111 through 117 are repeated as illustrated by loop 200 in FIG. 3. Further, system management processor 16 identifies and labels the working processor that failed in the bootstrapping operation as inoperative. The newly assigned boot strap processor subsequently updates the table to indicate the failed processor to the operating system.

While this invention has been particularly shown and described with references to preferred embodiments thereof, it will be understood by those skilled in the art that various changes in form and detail may be made therein without departing from the spirit and scope of the invention as defined by the appended claims.

What is claimed is:

1. A boot strap assignment system in a symmetric multiprocessor computer including a plurality of working processors each of which may serve as a boot strap processor and a central agent which assigns one of the working processors to be the boot strap processor as part of power-on configuration, the boot strap assignment system comprising:

a switching circuit which selectively transmits a boot strap assignment generated by the central agent to the working processors such that one of the working processors is assigned to serve as the boot strap processor; and a system management processor which monitors the operation of the multiprocessor computer and controls the switching circuit to determine which of the working processors working processors receives the boot strap assignment, wherein the switching circuit comprises a plurality of switches that intercept a boot strap assignment signal from the central agent to bus request lines passing between the working processors and selectively passes the boot strap assignment signal to only one of the bus request lines.

2. A boot strap assignment system as described in claim 1, wherein the switching circuit further comprises a demultiplexor that decodes a boot strap processor selection signal from the system management processor and selectively closes one of the switches to pass the boot strap assignment signal to the selected one of the bus request lines.

3. A boot strap assignment system as described in claim 1, wherein each of the working processors includes four bus request pins, one of the bus request pins being used to signal the other working processors over the bus request lines of a request to use a bus that is common to the working processors and the other bus request pins being used to detect bus requests from the other working processors.

4. A boot strap assignment system as described in claim 3, further comprising a watch dog timer which the boot strap processor resets upon finishing bootstrapping the multiprocessor computer.

5. A boot strap assignment system as described in claim 4, wherein the system management processor resets the multiprocessor computer and selects a new working processor to serve as boot strap processor in response to the watch dog timer timing-out after the previous boot strap processor fails to boot strap the multiprocessor computer.

6. A multiprocessor computer comprising:

a plurality of working processors connected to each other via rotated bus request lines, each of the working processors being capable of bootstrapping the computer;

a bus arbitration controller which arbitrates access to a bus for the working processors and which generates a boot strap assignment signal as part of power-on configuration that assigns responsibility for bootstrapping the computer among the working processors; and a switching circuit, coupled between the bus arbitration controller and the bus request lines of the working processors, the switching system selectively transmitting the boot strap assignment signal generated by the bus arbitration controller to the working processors via the bus request lines.

7. A multiprocessor computer as described in claim 6, further comprising a system management processor which controls the switching circuit to determine to which working processor the bootstrapping responsibility is assigned.

8. A multiprocessor computer as described in claim 6, wherein the switching circuit comprises a plurality of switches that intercept the boot strap assignment signal from the bus arbitration controller and selectively transmit the boot strap assignment signal to only one of the bus request lines.

9. A multiprocessor computer as described in claim 8, further comprising a demultiplexor that decodes a boot strap assignment signal from the system management processor and selectively closes one of the switches to pass the boot strap assignment signal to the selected one of the bus request lines.

10. A multiprocessor computer as described in claim 6, further comprising a watch dog timer which the boot strap processor resets upon finishing bootstrapping the multiprocessor computer.

11. A boot strap assignment system as described in claim 10, wherein the system management processor resets the multiprocessor computer and assigns a new processor as the boot strap processor in response to the watch dog timer timing-out after the previous boot strap processor failed to boot strap the multiprocessor computer.

12. A boot strap assignment system as described in claim 10, wherein each of the working processors includes four bus request pins, one of the bus request pins being used to signal the other working processors over the bus request lines of a request to use a bus that is common to the working processors and the other bus request pins being used to detect bus requests from the other working processors.

13. A boot strap assignment system in a symmetric multiprocessor computer including a plurality of working processors and a central agent which assigns one of the working processors to be the boot strap processor as part of power-on configuration, the boot strap assignment system comprising:

a switching circuit which selectively transmits agent identification signals simultaneously to all of the working processors, the agent identification signals assigning both an order in which the working processors are granted access to a common bus and a boot strap assignment, the agent identification signals being generated by the central agent to the working processors such that one of the working processors is assigned to serve as the boot strap processor.

14. A boot strap assignment system as described in claim 13, further comprising a system management processor which monitors the operation of the working processors and controls the switching circuit to dictate agent identity of the working processors via the distribution of the agent identification signals by the switching circuit.

15. A boot strap assignment system as described in claim 13, wherein the switching circuit further comprises a demultiplexor that decodes a boot strap processor selection signal from the system management processor and selectively closes one of the switches to pass the boot strap assignment signal to the selected one of the bus request lines.

16. A boot strap assignment system as described in claim 13, wherein each of the working processors includes four bus request pins, one of the bus request pins being used to signal the other working processors over the bus request lines of a request to use a bus that is common to the working processors and the other bus request pins being used to detect bus requests from the other working processors.

17. A boot strap assignment system as described in claim 13, further comprising a watch dog timer which the boot strap processor resets upon finishing bootstrapping the multiprocessor computer.

18. A boot strap assignment system as described in claim 17, wherein a system management processor resets the multiprocessor computer and selects a new working processor to serve as boot strap processor in response to the watch dog timer timing-out after the previous boot strap processor fails to boot strap the multiprocessor computer.

19. A multiprocessor computer comprising:

a plurality of working processors connected to each other via rotated bus request lines;

a bus arbitration controller which arbitrates access to a bus among the working processors and which generates agent identification signals that also serve as a boot strap assignment signal as part of power-on configuration that assigns responsibility for bootstrapping the computer among the working processors; and a switching circuit, coupled between the bus arbitration controller and the bus request lines of the working processors, the switching circuit selectively transmitting the agent identification signals among the working processors to dictate the working processor receiving the boot strap assignment signal via the bus request lines.

20. A boot strap assignment system as described in claim 19, wherein the switching circuit further comprises a demultiplexor that decodes a boot strap processor selection signal from the system management processor and selectively closes one of the switches to pass the boot strap assignment signal to the selected one of the bus request lines.

21. A boot strap assignment system as described in claim 19, wherein each of the working processors includes four bus request pins, one of the bus request pins being used to signal the other working processors over the bus request lines of a request to use a bus that is common to the working processors and the other bus request pins being used to detect bus requests from the other working processors.

22. A boot strap assignment system as described in claim 19, further comprising a watch dog timer which the boot strap processor resets upon finishing bootstrapping the multiprocessor computer.

23. A boot strap assignment system as described in claim 22, wherein a system management processor resets the multiprocessor computer and selects a new working processor to serve as boot strap processor in response to the watch dog timer timing-out after the previous boot strap processor fails to boot strap the multiprocessor computer.

* * * * *